Oct. 13, 1925.

H. M. SMITH

TRAVELING APRON

Filed Feb. 19, 1923

INVENTOR
Henry Monroe Smith
BY Charles G. Hensley
ATTORNEY

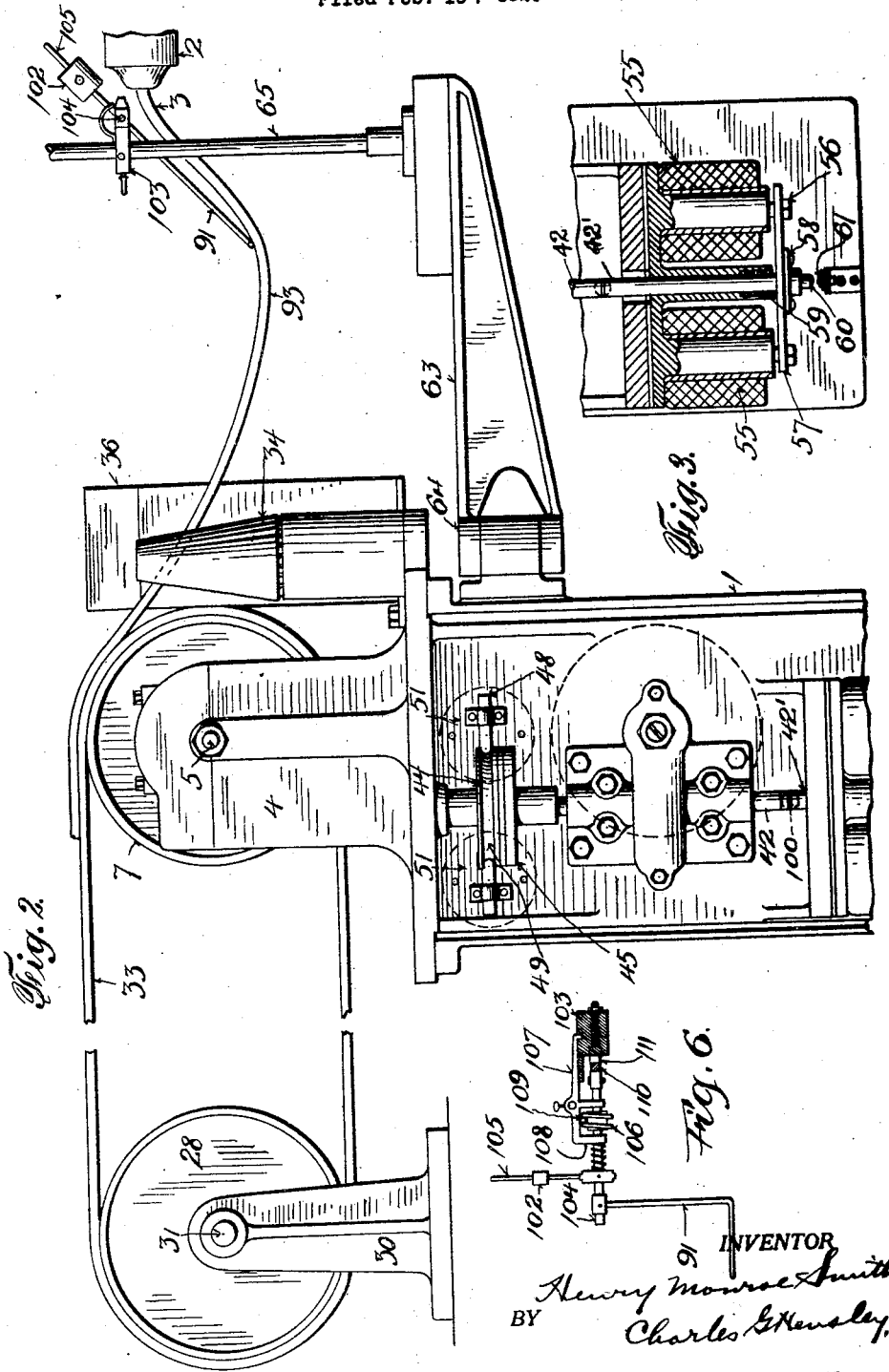

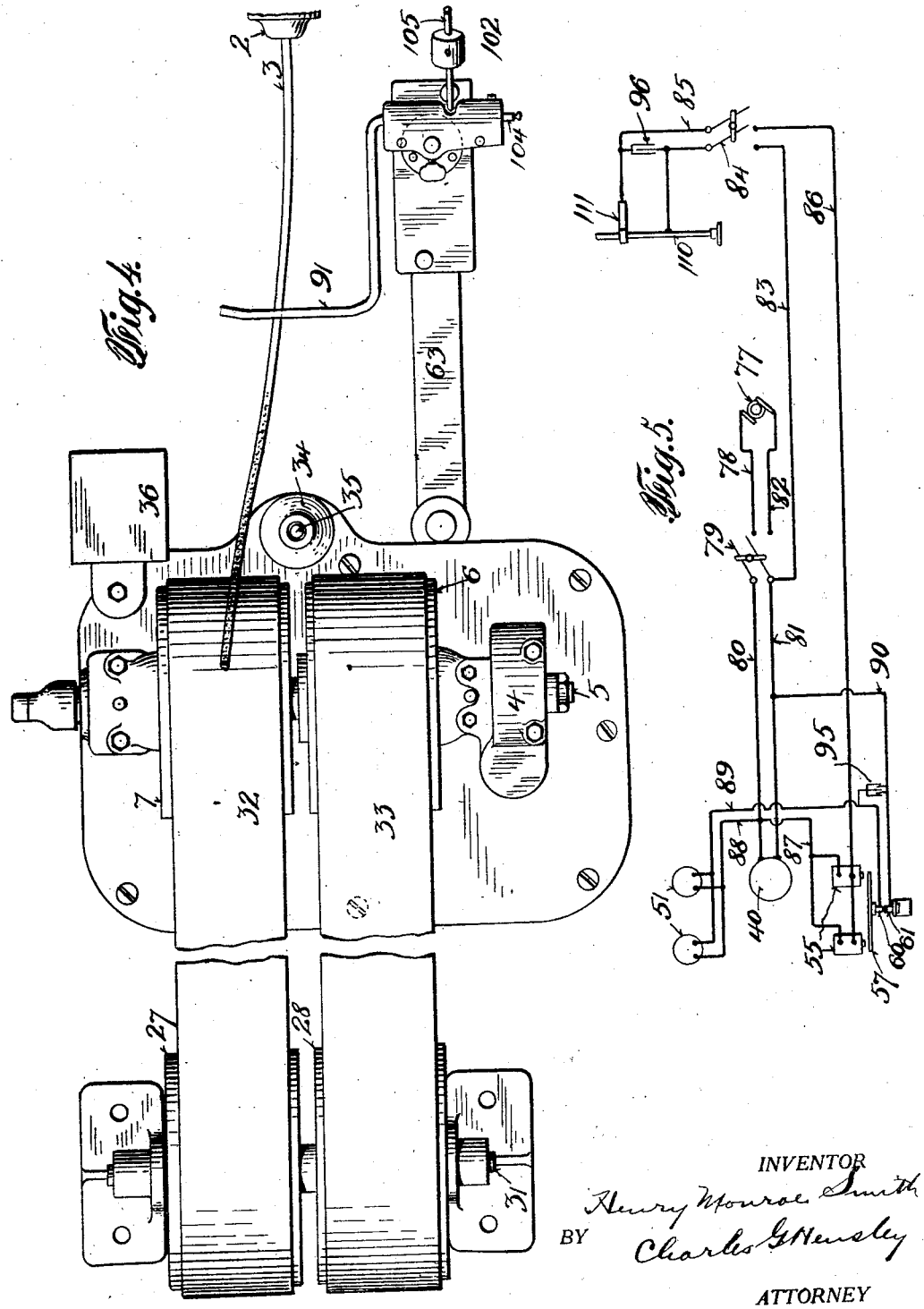

Patented Oct. 13, 1925.

1,556,728

UNITED STATES PATENT OFFICE.

HENRY MONROE SMITH, OF PATERSON, NEW JERSEY.

TRAVELING APRON.

Application filed February 19, 1923. Serial No. 620,099.

*To all whom it may concern:*

Be it known that I, HENRY MONROE SMITH, a citizen of the United States, and a resident of the city of Paterson, in the county of Passaic and State of New Jersey, have invented certain new and useful Improvements in Traveling Aprons, of which the following is a specification.

In the making of various products it is often necessary to provide a traveling support to receive a product from a machine and in the making of rubber tubing, rods and the like it is customary to feed the tube of rubber from the tube machine and while still in too soft a condition to be handled, upon what is commonly called a traveling apron. This so called apron, which is nothing more than a canvas belt running over pulleys and often fifty feet on each run, has heretofore been operated or moved periodically by a hand-operated wheel. If the apron is operated too fast or too far for the stock it is apt to pull out or lengthen the rubber tube because of its unstable character when it first comes from the tube machine in a warm condition. Or, if the tube is allowed to slack or droop down too far its weight will cause the same result. The object of the present invention is to provide a machine which will overcome these tendencies and which will operate automatically so that hand operation of the apron is eliminated. With the present device, the tube machine may be operated continuously.

The invention comprises a moving support preferably in duplicate form so that one length may be fed onto one apron while the other is being discharged from the companion apron; and automatic means controlled by the product itself for controlling the operation of the aprons. Other advantages will be apparent from the following detailed description of one embodiment of my invention.

In the drawings forming part of this application,

Figure 2 is a side elevation thereof with the cover of the casing removed to show the interior parts, Figure 3 is a detail view, on a large scale, showing one of the magnets, Figure 4 is a plan view of the machine, Figure 5 is a diagram of the electrical circuits, Figure 6 is a detail view of the automatic controller.

Figure 1:
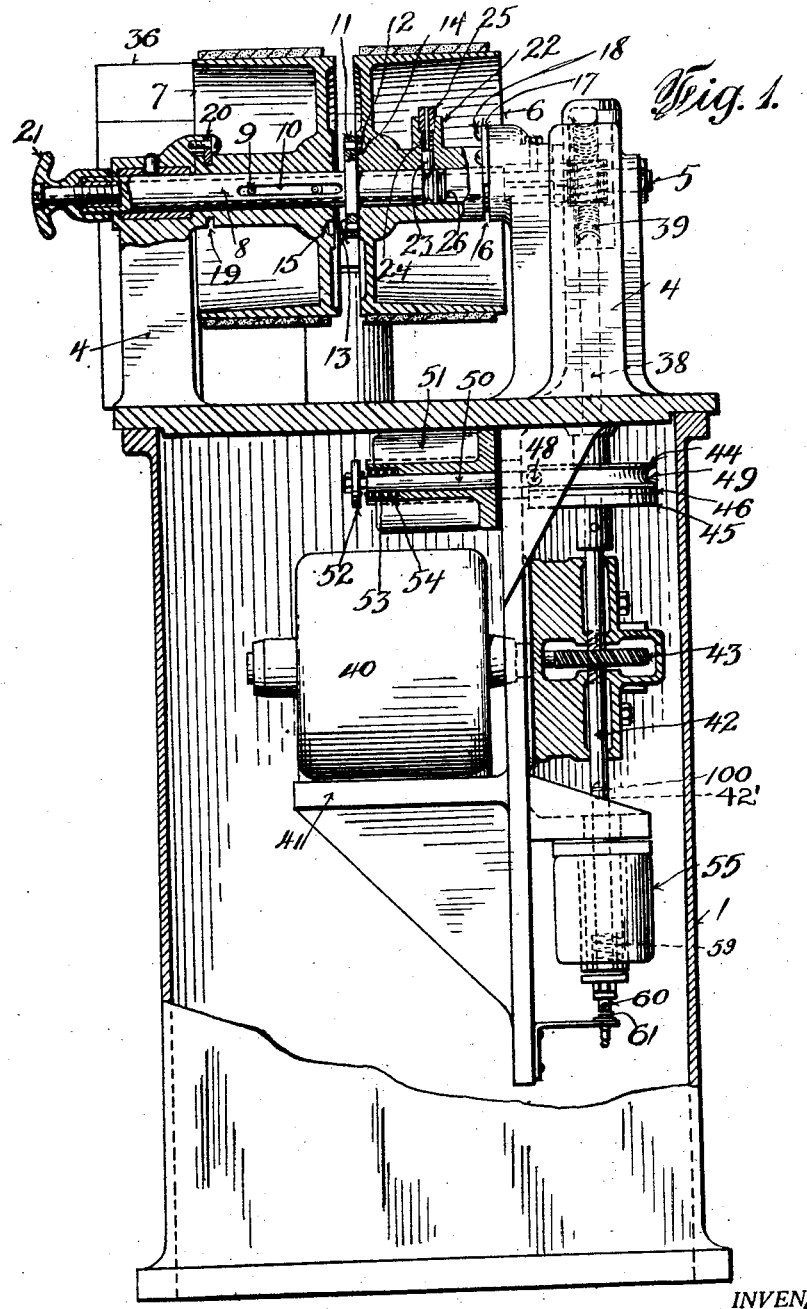
Figure 1 is a vertical sectional view of a machine embodying my invention.

The electrical parts of the machine I have mounted in a vertical casing 1 which may conveniently stand on the floor adjacent the tube or other machine the product of which is to be delivered upon the traveling apron. I have merely indicated the nozzle 2 of a tube machine for making rubber tubing, and the tube 3, generally still warm and in plastic condition, is delivered continuously from this nozzle.

Above or upon the casing 1—I have provided standards 4 in which a cross shaft 5 is journaled, and one, and preferably a pair, of pulleys 6, 7 are mounted loosely on this shaft in parallel relation. The reason for a pair of pulleys instead of one is because I prefer to provide a pair of adjacent traveling aprons in order that when a length of tubing has been run out on one apron and as soon as the length has been cut off, the free end of the newly formed tubing may be fed onto the adjacent apron before the severed piece has been removed from the first apron. In other words, the two aprons are used alternately. While this arrangement of double aprons is not vital it is much more efficient and the same will be described in detail.

These pulleys 6, 7 are loose on the shaft 5 and either can be thrown into or out of operative condition by means of a clutch device. As one apron only moves at a time I have used an alternate clutch device. There is a sleeve 8 which is slideable along the shaft 5 and it passes through the pulleys 6, 7. This sleeve revolves with the shaft 5 and for this purpose I have arranged pins 9 in the shaft 5 which project into the elongated slot 10 in the sleeve, whereby the latter is caused to revolve with the shaft, but it is free to slide along it. There is a disk 11 fixed to the sleeve 8 and it has a pin 12 facing in one direction which engages in one or more apertures 14 in the side of the pulley 6; and it has a pin 13 facing in the opposite direction which engages in one or more apertures 15 in the face of the pulley 7. Only one of these pins will engage a pulley at a time. There is a groove 16 in the hub of the pulley 6 and a disk 17 fastened to the frame by the screws 18 engages in this groove and prevents the pulley 6 from sliding on the sleeve 8 and following the disk 11. There is a similar groove 19 in the hub of the pulley 7 and there is a disk 20 fastened to the frame which engages in this groove to keep the pulley 7 from sliding along the sleeve 8. There is a hand knob 21 on the end of the sleeve 8 by means of which the operator may slide the sleeve 8 to the right or left in order to throw either pulley 6 or 7 into or out of operation. On the hub of the pulley 6 there is a boss 22 which has a bore directed at right angles to the axis of the sleeve 8 and in this there is a sliding pin 23 which is pressed down by a coiled spring 24 which is retained in the boss 22 by a cap 25. This pin 23 is adapted to engage in either of the grooves 26 in the sleeve 8 for the purpose of holding the sleeve from shifting after it has been set by hand in either its right or left positions.

At some distance from the pulleys 6, 7 I arrange a second set of pulleys 27, 28. I have shown standards 30 which may be set on a suitable bench and the pulleys 27, 28 mounted on the shaft 31 which is journaled in these standards 30, align with the pulleys 7, 6. The endless belt or apron 32 travels over the pulleys 7, 27 and the upper run constitutes the conveyor for the product; and the endless belt 33 in like manner travels over the pulleys 6, 28 and its upper run constitutes a conveyor for the product. In practice the two pairs of pulleys 6, 7 and 27, 28 are often fifty feet apart to handle fifty foot lengths of tubing but they may be any distance apart as desired.

There is a frustro-conical idler 34 mounted on a vertical shaft 35 in a line passing between the two aprons 32, 33 and this idler serves to guide the tube as it approaches one apron or the other in order that the tube will feed onto only one of the aprons at a time. I have shown a block 36 arranged in convenient position for the operator to place the tube upon it and to chop it off after the required length has been fed onto one of the aprons.

The device for operating the aprons is automatic; that is to say, the tube itself controls the movement of the aprons but as this tube is still soft or plastic when it comes from the tube machine it can not be pulled without altering its size or shape, or breaking it, and therefore the apron must be so operated that it will not pull on the tube. As a matter of fact, I prefer to have a slack or loop in the tube at all times between the tube machine and the aprons. I therefore provide the following operating mechanism.

The pulley shaft 5 is operated from the vertical shaft 38 through gears 39, mounted on these shafts. Within the casing 1 there is an electric motor 40 mounted on the shelf 41; and its shaft is geared to operate the vertical shaft 42 by means of spiral gears 43 arranged on the shaft of the motor and on the shaft 42 respectively, these gears meshing with each other. The vertical shaft is composed of three sections, i. e., the upper section 38 which directly drives the pulley shaft 5 and the lower section 42 which drives the upper section through an intermediate slip clutch, and a third lower section 42' which presses upwardly on the ball 100 to lift the section 42 and the disk 45. The section 42' does not revolve. There is shown a grooved disk or pulley 44 which is fixed to the upper shaft section 38 and there is a clutch disk 45 secured to the lower shaft 42, and there is a leather or other washer 46 interposed between these disks. It will be apparent that if the shaft section 42 is pressed upwardly the disk 45 will act on the disk 44 and thus the lower shaft section 42 will operate the upper section 38 and also either of the pulleys 6, 7 and either apron.

It is desirable to put a brake action on the parts operating with the shaft section 38, which includes the aprons, in order that these parts will stop quickly when they have moved the desired extent and in order that the disk 44 will not continue to follow the disk 45 when the aprons are to be arrested.

For this purpose I have shown a rod 50 which presses a stationary round belt 48 in the groove 49 of the clutch member 44 and which presses into this groove to act as a brake on this clutch member. This rod 50 moves with the armatures 52 of two magnets 51 mounted with their axes at right angles to the axis of the shaft section 38. The rods 50 are non-magnetic and are connected by an armature 52 so that when the coils of the magnets 51 are excited, the armature 52 and the rods 50 are drawn to the right in Figure 1 and this causes the rod 50 to press on the round belt 48 and the latter presses clutch member 44 and arrests the operation of the shaft section 38 and therefore the aprons. The armature 52, and the rods 50 are retracted by means of coiled springs 53 surrounding the rods 50 and compressed between the armature 52 and a shoulder in the recess 54 of the magnet mounting.

The clutch is preferably operated by means of magnets which lift the shaft sections 42', 42. I have known a pair of magnets 55 arranged near the lower end of the shaft section 42', each of which has a plunger 56 adapted to be lifted by the magnetic pull of its magnet. These plungers are connected across by an armature 57 on which the shaft section 42' rests. A coiled spring 59 mounted in a socket presses down on the armature 57 and this, with gravity, serves to lower the shaft section 42′ and the plungers 56. There is a contact member 61 with which the lower end 60 of the shaft section 42 makes contact when down and which breaks contact when this shaft section rises.

The device for automatically closing and opening the circuits to control the movements of the aprons is constructed as follows:—
There is a post 65 on which the insulating block 103 is mounted and this may be adjusted vertically on the post 65. There is a shaft 104 journalled in the block 103 and it carries a crank arm 91 which rests on the tubing between the post 65 and the traveling apron. There is an arm 105 fixed to the shaft 104 and it carries a counterweight 102 to keep the arm 91 in light contact with the tubing. The shaft 104 carries a worm 106 and the yoke 107 attached to the block 103 and through the arms 108 of which the shaft 104 is guided, has a roller 109 which engages in the groove of the worm 106. On one end of the shaft 104 there is a carbon contact point 110, whereas there is a metal contact point 111, fixed in the block 103. When the arm 91 moves down in following the loop in the tubing, the shaft 104 revolves slightly, revolving the worm 106 with it. As the worm is engaged by the stationary roller 109 the revolving movement of the shaft 104 causes the shaft 104 to shift either to the right or left in Figure 6, according to the direction of revolution of the shaft. In one direction of revolution of this shaft the worm 106 will cause the shaft to shift to the right, and the contact member 110 will touch the stationary contact 111 and this will connect wires 83 and 85 and start the operation of one of the aprons. If the shaft 104 revolves in the reverse direction, the worm 106 will cause the shaft 104 to shift to the left and this will move the contact member 110 away from the contact 111 and open the circuit between wires 83 and 85 and this will stop the movement of the apron.

The electrical circuits are as follows:—

At 77 I have shown a generator or any other source of electric current. The circuit to the motor 40 which drives the aprons may be traced through the wire 78 to one point of the switch 79 and through the switch, thence through the wire 80 to one pole of the motor. From the other pole of the motor the circuit is through the wire 81, thence through the switch 79 and thence through the wire 82 back to the generator or source of current. The motor 40 may be started and stopped by means of the switch 79 and when the apron device is in operation the motor will run continuously.

There is a wire 83 taken from one side of the switch 79 and this carries current to the contact point 110 on the post 65, a switch 84 being interposed in the line to throw on and off the automatic control. From the contact point 111 on the block 103 there is a wire 85 passing to the switch 84 and from there is a wire 86 which leads to one pole of both magnets 55. From the opposite poles of both magnets 55 there is a wire 87 which leads to one wire 80 forming part of the motor circuit. The circuit is completed through this wire 80 and the switch 79 and wire 78 back to the opposite side of the generator from that with which the wire 83 connects. There is a wire 88 leading from the junction of the wires 87 and 80 and this wire 88 leads to one pole of both the magnets 51 which operate the brake. From the other poles of these magnets 51 there is a wire 89 which leads to the armature 57 associated with the magnets 55. There is a wire 90 leading from the contact point 61 to the main line wire 81.

Operation. Assuming that the machine is ready to be operated, the following conditions will exist: The switches 79 and 84 will both be closed; the motor 40 will operate continuously, and the shaft section 42′ will be in contact with the point 61. Current will be passing through the wires 78, 80, 88, 89, 90 and 81 to the magnets 51. The magnets 51 are therefore energized and hold the brake member 48 against the grooved clutch member 44 and the traveling aprons are both idle. At this time the armature 57 is held down by a spring 59 and by gravity so that the point 60 is in contact with the point 61 and there is a break in the circuit of the magnets 55 at the points 110, 111 and therefore the magnets 55 are not energized and their armature 57 is down.

The leading end of the tube coming from the tube machine is passed to one side or the other of the idler 34 and the end of the tube is placed on one of the aprons, let us say on the apron 32. The path of the tube will be under the lever arm 91 and the arm 91 will rest on the tube. As the tube issues from the tube machine it will droop down into a slack or loop 93 between the tube machine and the apron 32. When the tube loop droops down, the arm 91 swings down to a point where the contacts 110, 111 are closed and this closes an electric circuit to operate the magnets 55. This will bring about the following changes. One result of closing contact at the points 110, 111 will be that the circuit which includes the coils of the magnets 55 will be closed and as these magnets are energized they will pull up the armature 57 and lift the shaft sections 42′, and 42. This will cause the clutch member 45 to press against the clutch member 44 and then the shaft section 38 will be driven by the section 42 which is operated by the motor 40 and this will drive the shaft 38 and one of the pulleys 6, 7. The clutch disk 11 will have been set by hand so that when the shaft 5 operates, the apron 32 on which the tube was led will travel and the other apron will remain idle.

When the armature 57 lifted in the above operation, the contact point 60 moved away from the contact point 61 and this broke or opened the circuit which includes the coils of the magnets 51 and therefore the springs 53 retracted the plungers 50 and armature 52 and released the pressure of the brake member 48 so that the clutch member 44 was free to be revolved by the time the clutch member 45 pressed against it.

The apron 32 will now travel with the upper run carrying the end of the tube away from the tube machine so that the tube feeds upon the upper run of this apron. When the slack or loop in the tube has been so taken up by the apron as to permit the lever arm 91 to swing up under the action of the counterweight 102, the contact point 110 will move away from the contact point 111 and this will cause the following changes; separation of the points 110, 111 will break the circuit which includes the coils of the magnets 55 and the armature 57 will fall and this will disengage the clutch member 45 from the clutch member 44; and the motor will cease to operate the apron 32. The falling of the armature 57 will also cause the contact point 60 to strike the contact point 61 and this will close the circuit which includes the coils of the magnets 51. The latter now being energized they will pull the plungers 50 and the armature 52 and press the brake member 48 against the clutch member 44 and thereby arrest the movement of this member, as well as that of the apron 32. The apron 32 will therefore not run any appreciable distance after the automatic device breaks circuit at the contact points 110, 111. The brake will remain in action and the apron 32 will remain idle until the loop of tube sags down sufficiently to close the contact 110, and the contact 111, and then the above operations will be repeated.

It will be apparent from this that the apron is automatically controlled in its operation by the tube itself and that the apron will never draw upon the tube fast enough to injure or stretch it if the parts are properly adjusted. The speed at which the tube issues from the tube machine will depend partly upon the size of the tube being made and therefore at different times or in the making of different size tubes the speed of the tube may differ over wide ranges. But whatever this speed may be the apron will automatically take up the tube without injuring it while in its soft or uncured condition.

When the tube has been taken up for the full length of the top run of the apron 32 or for any lesser extent, the operator lays the tube across the block 36 and cuts it off with a knife or chopper. The new end of the tube is then laid upon the apron 33 and the clutch 11 is thrown to throw this apron into operative condition and to throw the apron 32 out of operative condition. From then on the apron 33 will receive the issuing tube and while it is doing so the operator may proceed to remove the severed piece from the apron 32. The aprons are thus used alternately in order that the tube machine may operate without interruption.

I have shown a condenser 95 shunted across the wires 89, 90 to take up or store the charge in the line when contact is broken at the points 60, 61 to prevent arcing at this place.

For similar purposes I have shown a condenser 96 shunted across between the wires 83, 85 to hold the residual charge when contact between the points 110, 111 is broken to avoid arcing at this place.

From the above it will be apparent that the operation of the apron or aprons is automatic and that it is controlled by the product itself and without injury to the product even when it is in a soft or even plastic condition.

Having described my invention what I claim is:

1. A device for receiving a product from a machine, including a traveling apron on which the product is adapted to be received, means for operating said apron and means actuated by the product which is being fed upon said apron for controlling the operation of the apron by its said operating means, said controlling means being adapted to cause the starting and stopping of said apron whereby it will receive the product at the rate at which it is delivered thereto by the machine.

2. A device for receiving a product from a machine, including a plurality of movable supports either of which is adapted to receive thereon the product, means for operating said supports, means actuated by the product which is fed upon said supports for controlling the rate of operation of said supports by their operating means, and means for placing either of said supports into and out of operating condition.

3. A device for receiving a product from a machine, including a plurality of adjacent, substantially parallel aprons either of which is adapted to receive thereon the product, means for operating said aprons, means actuated by the product which is fed upon said aprons for controlling the rate of operation of said aprons by their operating means, and means for placing either of said aprons into and out of operative condition.

4. A device for receiving a product from a machine, including a movable support on which the product is adapted to be received, means for operating said support, means actuated by the product which is fed upon said support for controlling the operation of the support by its said operating means, and a brake for said movable support, controlled by said product.

5. A device for receiving a product from a machine, including a movable support on which the product is adapted to be received, means for operating said support, means actuated by the product which is fed upon said support for controlling the operation of the support, and a brake for the movable support, controlled by the product and adapted to be applied when said support is idle and to be released when the support is moving.

6. A device for receiving a product from a machine, including a movable support on which the product is adapted to be received, means for operating said support and including resistable means and means actuated by the product which is fed upon said support for controlling the operation of the support by its said operating means.

7. A device for receiving a product from a machine, including a movable support on which the product is adapted to be received, means for operating said support and including a slip clutch, and means actuated by the product which is fed upon said support for controlling the operation of the support by its said operating means.

8. A device for receiving a product from a machine, including a movable support on which the product is adapted to be received, means for operating said support and including a clutch, and a magnet controlled by said product and adapted to actuate said clutch.

9. A device for receiving a product from a machine, including a movable support on which the product is adapted to be received, and means for operating said support including continuously operating driving means, a clutch for causing said driving means to actuate said support, and means actuated by the product for controlling the operation of said clutch.

10. A device for receiving a product from a machine, including a movable support on which the product is adapted to be received, means for operating said support and including a clutch, a magnet controlled by said product for actuating said clutch, a brake for said support, and a magnet for actuating said brake.

11. A device for receiving a product from a machine, including a movable support on which the product is received, means for operating said support, controlling means for said operating means, including an electrical device, circuit controlling means for said electrical device actuated by said product, a brake device for said support including an electrical device and circuit controlling means actuated by said first electrical device for controlling said second electrical device.

12. A device for receiving a product from a machine, including a movable support on which the product is received, means for operating said support, controlling means for said operating means including a magnet, circuit controlling means for said magnet actuated by said product, a brake for said support including a magnet, and circuit controlling means actuated by said first magnet for controlling said second magnet.

13. A device for receiving a product from a machine, including a movable support on which the product is received, means for operating said support, including continuously operated means, a clutch for throwing said support into operation by said operating means, a magnet for actuating said clutch, circuit controlling means actuated by the product for controlling said magnet, a brake for said support, a magnet for actuating said brake, and circuit controlling means actuated by said first magnet for controlling said second magnet.

14. A device for receiving a product, including a movable support on which the product is received, means for operating said support, said device being arranged whereby the product will form in a drooping or loose loop, and means for controlling the operation of said support, including an electrical device, and circuit controlling means including a movable member actuated by said product when said loop extends to a predetermined extent.

Signed at the city, county and State of New York, this third day of February, 1923.

HENRY MONROE SMITH.